INVENTORS
Richard HETMANN
Josef BEHR

BY Dike & Craig
ATTORNEYS

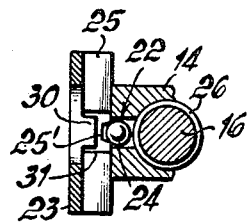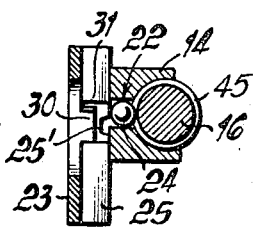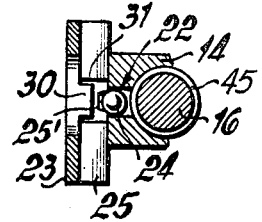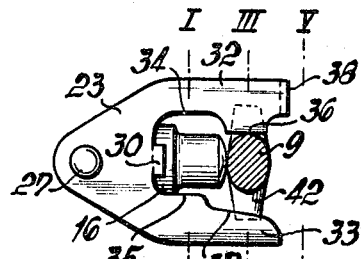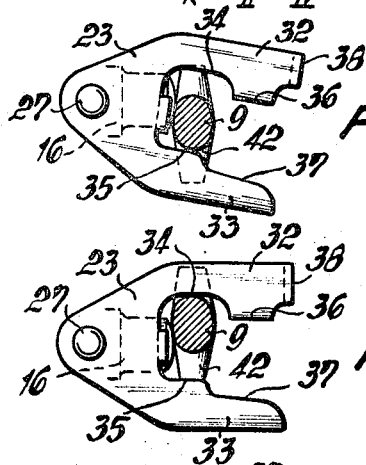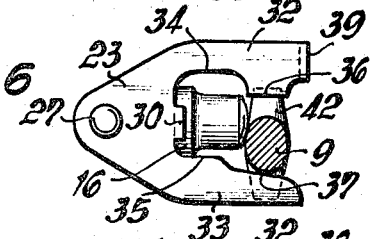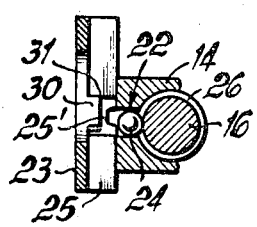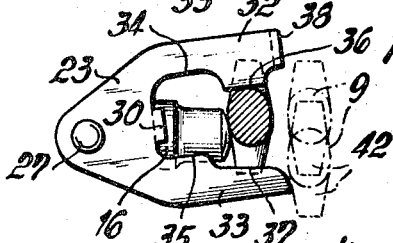

United States Patent Office 3,418,866
Patented Dec. 31, 1968

3,418,866
SHIFTING ARRANGEMENT FOR MULTI-SPEED GEAR WHEEL CHANGE-SPEED TRANSMISSIONS, ESPECIALLY FOR MOTOR VEHICLES
Richard Hetmann, Tamm, and Josef Behr, Stuttgart-Rot, Germany, assignors to Firma Dr. Ing. h.c.F. Porsche KG, Stuttgart-Zuffenhausen, Germany
Filed Apr. 15, 1966, Ser. No. 542,789
Claims priority, application Germany, May 6, 1965, P 36,716
31 Claims. (Cl. 74—477)

ABSTRACT OF THE DISCLOSURE

A shifting mechanism for multi-speed, gear-wheel change-speed transmissions, especially for motor vehicles, in which the shifting or engagement of the speeds takes place by means of a shifting finger which cooperates with several shifting rods arranged parallel to one another, of which only one can be displaced at any one time, whereas the movement of the remaining shifting rods is blocked by a blocking mechanism which comprises an independent and self-supporting U-shaped bow or yoke member between whose leg portions is pivotally supported the shifting finger and whereby the shifting finger provided with projections or nose portions engages during the shifting movement in apertures of the leg portions of the bow-shaped yoke member. A guide plate is drivingly connected to the shifting finger for movement in the planes of the shifting rods, an abutment bolt is resiliently urged into engagement with the shifting finger for movement in the selecting plane perpendicular to the shifting rod, and a detent mechanism is actuated by movement of the abutment bolt to lock the guide plate for positions of the shifting finger between shifting rods.

Background of the invention

A shifting mechanism for multi-speed, gear-wheel change-speed transmissions, especially for motor vehicles, in which the shifting or engagement of the speeds takes place by means of a shifting finger which cooperates with several shifting rods arranged parallel to one another, of which only one can be displaced at any one time, whereas the movement of the remaining shifting rods is blocked by a blocking mechanism which comprises an independent and self-supporting U-shaped bow or yoke member between whose leg portions is pivotally supported the shifting finger and whereby the shifting finger provided with projections or nose portions engages during the shifting movement in apertures of the leg portions of the bow-shaped yoke member is described in the German application P 32,374 XII/47h, with U.S. Patent 3,263,518 issued Aug. 2, 1966, to Richard Hetmann corresponding thereto.

In the shifting mechanism according to the aforementioned application, there is prevented by the projections or nose portions arranged at the shifting finger in conjunction with corresponding apertures at the leg portions of the bow-shaped yoke member that a shifting operation can be realized as long as the head of the shifting finger is disposed between the shifting extensions of two adjacent shifting rods. If the shifting mechanism is actuated from a manual shifting lever arranged remote from the change-speed gear, then there exists the danger by reason of the necessary transmission linkage, within which are included, for the most part, elastic coupling elements, that the preselection of the shifting finger is not carried out accurately. This may lead accidentally to undersirable over-shifting operations of transmission ratios or speeds, i.e. to a manual shifting in which a speed or transmission ratio is jumped over or by-passed. In order to prevent faulty shifting operations, it is known in the prior art to connect the shifting lever with a shifting plate which is displaceably guided in the transmission against the force of elastic pressure points. The reached shifting position of the shifting lever is to be indicated thereby to the driver by a corresponding graduation of the pressure points. This prior art shifting installation, however, entails the disadvantage that it depends exclusively on the sensing or feel whether the driver finds the desired shifting lane or channel. However, with multi-speed transmissions, the individual speeds or transmission ratios to be engaged cannot be marked with sufficient distinction.

Summary of the invention

According to the present invention, these disadvantages are avoided in that a guide plate is coordinated to the shifting finger held in the plane of the shifting direction of one of the shifting rods by an abutment adapted to be overcome by pressure, which guide plate pivotally supported at the bow-shaped yoke member actuates in dependence of at least one shifting movement of the shifting finger a locking means for the abutment adapted to be overcome by pressure. A shifting installation is realized thereby suitable in particular for remote shifting devices by means of which faulty shifting operations are avoided with certainty. Additionally, it is also assured thereby that the driver, when shifting up or down, can only engage the next -following speed which contributes significantly to the protection of the transmission. In contrast to the known guide-plate shifting devices, no particular attention is required with the present invention to find during the preselection of the speed the correct shifting lane or path since the shifting finger and therewith the shifting lever are necessarily guided into a predetermined neutral position.

The guide plate or template comprises advantageously fork-like arms provided with guide surfaces for the shifting finger and is pivotally supported at the bow-shaped yoke member at a distance from the shifting finger and substantially perpendicularly to the axis of the abutment adapted to be overcome by pressure, preferably by means of frictional restraining means. An operationally reliable and simultaneously simple construction is obtained thereby. Preferably one of the arms of the guide plate is provided with an angularly bent web portion which serves as abutment for the shifting finger, preferably in the plane of the center one of three shifting rods. It is achieved thereby that the shifting finger, during disengagement of a previously engaged speed, slides back only to the predetermined starting position and does not jump into an undersired shifting lane or channel. The guide plate is form-lockingly connected with a locking slide member displaceably retained on the bow-shaped yoke member, which locking slide member contains an aperture for the accommodation of a detent ball that cooperates with the abutment adapted to be overcome by pressure. The involved costs for the guidance and detent means are thereby kept small. The abutment adapted to be overcome by pressure preferably consists of a spring-loaded bolt which extends between the leg portions of the bow-shaped yoke member and is provided with an annular groove for the engagement of the detent ball. A favorable assembly and adjustment of the shifting mechanism is realized if the abutment adapted to be overcome by pressure, the guide plate and the locking means for the abutment form a structural unit together with the bow-shaped yoke member, which unitary structure is detachably connected from the outside with the part of the transmission housing receiving the shifting device.

Accordingly, it is an object of the present invention to provide a shifting mechanism for a multi-speed change-speed transmission which obviates by extremely simple and operationally reliable means the aforementioned drawbacks and shortcomings encountered with the prior art constuctions.

It is another object of the present invention to provide a shifting mechanism for multi-speed change-speed gears which not only prevents improper movements of the shifting finger before reaching the predetermined shifting channel but also effectively prevents the jumping over or by-passing of the next adjacent speed during normal shifting opeartions.

A further object of the present invention resides in a shifting mechanism for multi-speed, change-speed transmissions which precludes faulty shifting operations without the need for reliance on the driver's subjective feel of sensing capability.

Still a further object of the present invention resides in a shifting mechanism which is so constructed and arranged that the next speed cannot be missed by the driver either in the up or down shifting operations.

A still further object of the present invention resides in a shifting mechanism of the type described above, which achieves all of the aforementioned aims and objects, particularly with a change-speed gear shifted remotely, by a manual shifting lever, without requiring special attention to achieve proper preselection.

Another object of the present invention resides in a shifting mechanism for change-speed transmissions which is relatively inexpensive in cost and assembly and results in wear-saving operation for the transmission.

*Brief description of the drawing*

These and further objects, features, and advantages of the present invention will become more obvious from the following description when taken in connection with the accompanying drawing, which shows, for purposes of illustration only, one embodiment in accordance with the present invention, and wherein:

FIGURE 3 is a plan view on the shifting guide plate in the neutral position of the transmission with the shifting pattern indicated in dash and dot lines;

FIGURE 3a is a partial transverse cross-sectional view illustrating the corresponding neutral position of the locking means for the abutment to be overcome by pressure which corresponds to the neutral position of the guide plate of FIGURE 3.

FIGURE 4 is a plan view, similar to FIGURE 3, on the shifting guide plate in the position of the engaged reverse speed, blocking means;

FIGURE 4a is a partial cross-sectional view, similar to FIGURE 3a, and illustrating the corresponding position of the locking means with the reverse speed engaged;

FIGURE 5 is a plan view, similar to FIGURES 3 and 4, on the shifting guide plate in the position of the engaged first speed;

FIGURE 5a is a partial cross-sectional view, similar to FIGURES 3a and 4a, illustrating the corresponding position of the locking means with the engaged first speed;

FIGURE 6 is a plan view, similar to FIGURES 3, 4 and 5 on the shifting guide plate in the engaged position of the second speed;

FIGURE 7 is a plan view, similar to FIGURES 3, 4, 5 and 6, on the guide plate in the engaged position of the third speed, whereby the position of the shifting finger in the position of the fourth speed is shown in dash lines and the position thereof in the fifth speed is shown in dash and dot lines; and FIGURE 7a is a cross-sectional view, similar to FIGURES 3a, 4a, and 5a, illustrating the corresponding position of the locking means for the abutment to be overcome by pressure with the engaged third speed.

*Detailed description of the drawing*

Figure 1:
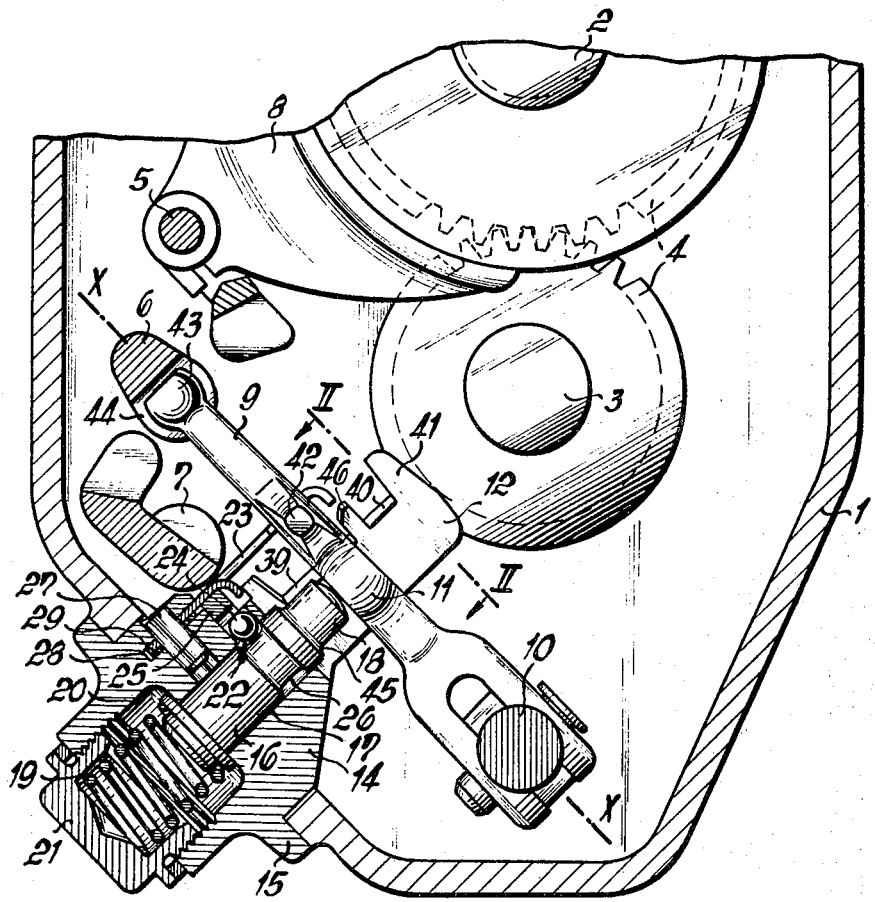
FIGURE 1 is a partial, transverse cross-sectional view through a multi-speed, gear-wheel change-speed transmission, taken within the area of the shifting mechanism provided with the blocking means according to the present invention.
Figure 2:
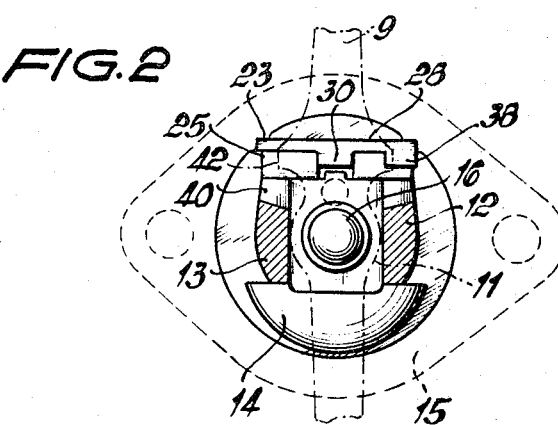
FIGURE 2 is a partial cross-sectional view, taken along line II—II of FIGURE 1, whereby the shifting figure is shown in part in dash and dot lines.

Referring now to the drawing wherein like reference numerals are used throughout the various views to designate like parts, reference numeral 1 designates in FIGURE 1 the transmission housing of the change-speed transmission within which are suitably supported a transmission drive shaft 2 and a transmission output shaft 3. The various conventional shifting gear-sets 4 of a change-speed transmission of known construction having five forward speeds and a reverse speed are mounted on the shafts 2 and 3 in a manner not shown in detail herein since it forms no part of the present invention and is of conventional nature. Shifting rods 5, 6, and 7 are provided for the shifting or engagement of the various speeds or transmission ratios which shifting rods act on the gear wheel sets 4 by way of the indicated shifting forks 8. A shifting finger 9 is provided for the displacement of the shifting rods 5, 6, and 7, which is pivotally connected on a shifting shaft 10 which, in turn, is in operative connection with the manual transmission shifting lever (not shown) by conventional means. The shifting finger 9 is provided with ball-shaped bearing faces 11 (FIG. 2) by means of which the shifting finger 9 is pivotally supported in two mutually perpendicular planes between the leg portions 12 and 13 of a U-shaped bow-like yoke member 14. The bow-shaped yoke member 14 is provided with a flange 15, is detachably secured at the transmission housing 1 and possesses a central bore 17 for the accommodation of an abutment bolt 16. The head portion 18 of the abutment bolt 16 extends between the leg portions 12 and 13 and is under the effect of a compression spring 19. The compression spring 19 is arranged within an aperture 20 in the bow-shaped yoke member 14 and rests against a closure member 21. A locking means generally designated by reference numeral 22 is coordinated to the abutment bolt 16 which secures the bolt 16 against axial displacement within the bore 17 in dependence on the position of a guide plate 23 for the shifting finger 9. The locking means 22 (FIG. 3) consists of a detent ball 24 radially displaceably retained in the bow-shaped yoke member 14 and of a slide member 25 which contains an aperture 25′ for the detent ball 24. The detent ball 24 is in engagement with an annular groove 26 provided in the abutment bolt 16. The guide plate 23 is pivotally mounted about a pin 27 arranged perpendicularly to the abutment bolt 16 within a slot 28 (FIG. 2) of the bow-shaped yoke member 14. The pivot movement of the guide plate 23 takes place against the frictional restraining effect of a spring plate 29 (FIG. 1). The guide plate 23 is in engagement by way of a tongue portion 30 (FIGURES 2 and 3a) angularly bent in the direction toward the abutment bolt 16 with a groove 31 provided in the slide member 25 and includes on both sides thereof arms 32 and 33 (FIG. 5) between which extends the shifting finger 9. Guide surfaces 34, 35, 36 and 37 as well as an angularly bent web portion 38 are arranged at the guide plate 23 for guiding the shifting finger 9. The leg portions 12 and 13 of the bow-shaped yoke member 14 are provided with apertures 39 and 40 for the latching of the shifting finger 9 (FIGURES 1 and 2) and are provided with an end abutment 41 (FIG. 1) for the limiting of the preselection movement. The apertures 39 and 40 as well as the end abutment 41 cooperate with nose portions or projections 42 (FIGURES 1 and 2) extending in the shifting direction and provided at the shifting finger 9 as described more fully in the aforementioned application.

In the starting position of the shifting mechanism illustrated in FIGURE 3, the shifting finger 9 is retained by the abutment bolt 16 in the plane X—X of the shiftnig rod 6 and of the shifting shaft 10 so that the head portion 43 of the shifting finger 9 engages the shoulder 44 of the shifting rod 6. This position corresponds to the shifting pattern indicated in FIGURE 3 to the shifting plane of the II and III gear or speed. The arms 32 and 33 of the guide plate 23 thereby come to lie parallel to the axis of the abutment bolt 16 in the plane X—X of the shifting rod the detent ball 24 of the locking means 22 rests in front of the aperture 25′ of the slide member 25.

If, for example, the reverse speed (FIG. 4) is now engated, then as a result of the pre-selection initiated at the shifting lever (not shown) by way of the shifting shaft 10, the shifting finger 9 reaches the plane of the shifting rod 7. The shifting finger 9 thereby presses back the abutment bolt 16 against the effect of the compression spring 19 whereby the detent ball 24 at first glides into the aperture 25′ of the slide member 25. The end position is reached when the collar 45 of the abutment bolt 16 comes to lie behind the detent ball 24 and the latter again engages securingly between the collar 25 and the head portion 18 of the bolt 16. As a result thereof, the shifting finger is now relieved from the pressure of the spring 19 and can now be moved in the shifting direction R (FIG. 3) which completes the shifting operation. With this shifting operation, the shifting finger 9 presses against the surface 35 of the guide plate 23 whereby the latter is pivoted in the clockwise direction about pin 27 and assumes the position thereof illustrated in FIGURE 4.

For purposes of engaging the first speed from the described reverse position, the shifting finger 9 is moved in the opposite shifting direction. At first, the guide plate 23 and the locking mechanism 22 initially remain in its previously assumed position. In the course of the shifting movement, the shifting finger 9 comes into abutment at the surface 34 and returns the guide plate 23 into the initial position illustrated in FIGURE 3. The position is reached when the change-speed or shifting operation is completed. Since the locking means 22 is now released, there exists the danger that during the shifting into the next-following II speed, the shifting finger 9 jumps into the plane of the IV and V speed owing to the unstressing spring 19. However, the web portion 38 of the guide plate 23 against which engages in this case one of the nose portions 42 of the shifting finger 9, prevents an undesired jumping or by-passing of the II speed. The position of the engaged II speed is illustrated in FIGURE 6.

When shifting further into the III speed, the shifting finger 9 comes into abutment at the surface 36 of the guide plate 23 and pivots the same in the counterclockwise direction until it assumes the position illustrated in FIGURE 7. As a result of the pivot movement, the locking mechanism 22 is locked simultaneously as illustrated in FIGURE 7a whereby an unintentional downshifting of the transmission is prevented.

The shifting finger 9, during the further shifting operation from the III speed, glides from III speed by way of the surface 37 into the position of the IV speed indicated in dash lines and from there can be pressed in the direction of the V speed as indicated in dash and dot lines.

By reason of the fact that during the last-mentioned shifting movements, the guide plate 23 remains stationary in the position illustrated in FIGURE 7, it is impossible during the down-shifting of the transmission that a speed is jumped over or by-passed. A shifting-back, for example, from V speed to III speed is prevented by the web portion 38 of the guide plate 23 against which abuts in this case the nose portion 42 of the shifting finger 9. The locked abutment bolt 16 prevents simultaneously that the I or reverse speed is engaged from the higher speeds. The locking remains effective for such length of time until the shifting finger 9 with the aid of the surface 37 pivots back the guide plate 23 in the II speed position, i.e., in the original starting position.

The possible movement of two shifting rods is, as described in the aforementioned application, precluded in that the nose portions 42 of the shifting finger 9 abut against the web portions 46 of the apertures 39 and 40 so that the shifting finger 9 carries out the initiated shifting movement only when an aligned latching is possible.

While we have shown and described one embodiment in accordance with the present invention, it is understood that the same is not limited thereto but is susceptible of numerous changes as known to a person skilled in the art. For example, the present invention is not limited to remotely actuated shifting devices but is also suitable for other transmission shifting devices in which the manual shifting lever engages directly with the shifting rods of the transmission.

Thus, it is obvious that the present invention is not limited to the details shown and described herein and we therefore do not wish to be limited to these details but intend to cover all such changes and modifications as are encompassed by the scope of the appended claims.

We claim:

1. A shifting mechanism for a multi-change-speed transmission, especially for motor vehicles, comprising several substantially parallelly arranged shifting rods for engaging the various speeds, shifting finger means adapted to be engaged selectively with any one of said rods, blocking means for enabling displacement of only one of said rods while blocking the movement of the remaining rods, including substantially U-shaped means having leg portions, the shifting finger means being pivotally supported between said leg portions, said leg portions being provided with aperture means, and said shifting finger means being provided with nose portions engaging into said aperture means during the shifting movement of the shifting finger means, abutment means for retaining said shifting finger means in the plane of one of said rods, guide plate means coordinated to said shifting finger means and pivotally supported at said U-shaped means, and further locking means for said abutment means actuated in dependence on at least one shifting movement of the shifting finger means, said abutment means being adapted to be overcome by pressure.

2. The shifting mechanism according to claim 1, wherein said guide plate means includes fork-like arm portions provided with guide surface means for the shifting finger means, and pivotal means pivotally mounting said guide plate means at a distance from said shifting finger means approximately perpendicularly to the axis of said abutment means.

3. The shifting mechanism according to claim 2, wherein said last-mentioned pivotal means includes means frictionally restraining the movement of said guide plate means.

4. The shifting mechanism according to claim 3, whereone of the arm portions includes an angularly bent web portion which serves as abutment for the shifting finger means.

5. The shifting mechanism according to claim 4, wherein said web portion serves as abutment for the shifting finger means in the plane of the center one of the three shifting rods.

6. The shifting mechanism according to claim 5, wherein said further locking means includes a locking slide member displaceably mounted on said U-shaped means, said guide plate means being form-lockingly connected with said locking slide member, and said locking slide member being provided with an aperture for receiving a detent ball which cooperates with said abutment means.

7. The shifting mechanism according to claim 6, wherein the abutment means adapted to be overcome by pressure includes a spring-loaded bolt which extends between the leg portion of the U-shaped means and is provided with an annular groove for the engagement of the detent ball.

8. The shifting mechanism according to claim 7, wherein said abutment means, said guide plate means, and said further locking means together with said U-shaped means form a structural unit which is connected detachably from the outside with the part of a transmission housing receiving the shifting mechanism.

9. The shifting mechanism according to claim 2, wherein one of the arm portions includes an angularly bent web portion which serves as abutment for the shifting finger means.

10. The shifting mechanism according to claim 1, wherein said further locking means includes a locking slide member displaceably mounted on said U-shaped means, said guide plate means being form-lockingly connected with said locking slide member, and said locking slide member being provided with an aperture for receiving a detent ball which cooperates with said abutment means.

11. The shifting mechanism according to claim 10, wherein the abutment means adapted to be overcome by pressure includes a spring-loaded bolt which extends between the leg portion of the U-shaped means and is provided with an annular groove for the engagement of the detent ball.

12. The shifting mechanism according to claim 1, wherein said abutment means, said guide plate means, and said further locking means together with said U-shaped means form a structural unit which is connected detachably from the outside with the part of a transmission housing receiving the shifting mechanism.

13. A shifting mechanism for a multi-change speed transmission, having a housing especially for motor vehicles, comprising several shifting rods for engaging the various speeds, shifting finger means adapted to selectively engage any one of said rods, abutment means resiliently retaining said shifting finger means in the plane of one of said rods, guide plate means drivingly connected to said shifting finger means and pivotally supported with a relatively fixed part of the housing, and means locking said guide plate means actuated by said abutment means in dependence on at least one shifting movement of the shifting finger means out of said plane of said one rod.

14. The combination according to claim 13 wherein said relatively fixed part is a substantially U-shaped yoke member with said shifting finger means pivotally supported between the leg portions of said yoke member.

15. The shifting mechanism according to claim 14, wherein said guide plate means includes fork-like arm portions provided with guide surface means for the shifting finger means, and pivotal means pivotally mounting said guide plate means at a distance from said shifting finger means substantially perpendicularly to the axis of said abutment means.

16. The shifting mechanism according to claim 15, wherein said pivotal means includes means frictionally restraining the movement of said guide plate means.

17. The shifting mechanism according to claim 16, wherein one of the arm portions includes an angularly bent web portion which serves as abutment for the shifting finger means.

18. The shifting mechanism according to claim 17, wherein said web portion serves as abutment for the shifting finger means in the plane of the center one of three shifting rods.

19. The shifting mechanism according to claim 15, wherein one of the arm portions includes an angularly bent web portion which serves as abutment for the shifting finger means.

20. The shifting mechanism according to claim 19, wherein said locking means includes a locking slide displaceably mounted on said relatively fixed part, said guide plate means being form-lockingly connected with said locking slide member, and said locking slide member being provided with an aperture for receiving a detent ball which cooperates with said abutment means.

21. The shifting mechanism according to claim 20, wherein the abutment means adapted to be overcome by pressure includes a spring-loaded bolt which extends between the leg portion of the U-shaped yoke member and is provided with an angular groove for the engagement of the detent ball.

22. The shifting mechanism according to claim 21, wherein said abutment means, said guide plate means, and said locking means together with said U-shaped yoke member form a structural unit which is connected detachably from the outside with the part of the transmission housing receiving the shifting mechanism.

23. The shifting mechanism according to claim 13, wherein said guide plate means includes fork-like arm portions provided with guide surface means for the shifting finger means, and pivotal means pivotally mounting said guide plate means at a distance from said shifting finger means substantially perpendicularly to the axis of said abutment means.

24. The shifting mechanism according to claim 23, wherein one of the arm portions includes an angularly bent web portion which serves as abutment for the shifting finger means.

25. The shifting mechanism according to claim 14, wherein said locking means includes a locking slide displaceably mounted on said relatively fixed part, said guide plate means being form-lockingly connected with said locking slide member, and said locking slide member being provided with an aperture for receiving a detent ball which cooperates with said abutment means.

26. The shifting mechanism according to claim 25, wherein the abutment means adapted to be overcome by pressure includes a spring-loaded bolt which extends between the leg portion of the U-shaped yoke member and is provided with an annular groove for the engagement of the detent ball.

27. The shifting mechanism according to claim 14, wherein said abutment means, said guide plate means, and said locking means together with said U-shaped yoke member form a structural unit which is connected detachably from the outside with the part of the transmission housing receiving the shifting mechanism.

28. A shifting mechanism for a change-speed transmission having a shifting finger movable in one plane to select one of at least two shifting members and movable generally perpendicular to the one plane to shift the selected shifting member, and having blocking means preventing simultaneous shifting of two of the shifting members, the improvement in the blocking means comprising: an abutment member drivingly connected with said shifting finger for movement in said one plane during the selection of one of said shifting members; a guide member drivingly connected with said shifting finger for movement generally perpendicular to said one plane; detent means selectively locking said guide member having one position preventing movement of said guide member generally perpendicular to said one plane and having a second position allowing movement of said guide member generally perpendicular to said one plane; said abutment member having means moving said detent means between its two positions in response to movement with said shifting finger in said one plane.

29. The shifting mechanism according to claim 28, wherein said abutment member is separate from and spring urged into engagement with said shifting finger.

30. The shifting mechanism according to claim 28, wherein said guide member includes a pivotally mounted plate having an elongated slot receiving therein said shifting finger for free play in the direction of said one plane.

31. The shifting mechanism according to claim 28, wherein said detent means includes a locking recess in said guide member, a locking element fixedly mounted except for movement into and out of said recess, and a cam on said abutment member for moving said locking element into said recess when said shifting finger is between said shifting members.

References Cited

UNITED STATES PATENTS

| | | | |
|---|---|---|---|
| 1,370,609 | 3/1921 | Schwartz | 74—475 |
| 2,304,375 | 12/1942 | Peterson et al. | 74—473 |
| 3,238,807 | 3/1966 | Hetmann | 74—477 |
| 3,312,120 | 4/1967 | Mercer | 74—475 |
| 3,329,039 | 5/1967 | Johnson | 74—473 |

FRED C. MATTERN, Jr., *Primary Examiner.*

B. T. CALLAHAN, *Assistant Examiner.*